Nov. 21, 1944.                    C. H. ADAMS                    2,363,033
                    DOUBLE END TOOLING MECHANISM AND ATTACHMENT
                       Filed Nov. 28, 1940            6 Sheets-Sheet 1

Inventor
Clarence H. Adams
Wright, Rowart, Quinby & May
Attys.

Nov. 21, 1944.  C. H. ADAMS  2,363,033
DOUBLE END TOOLING MECHANISM AND ATTACHMENT
Filed Nov. 28, 1940  6 Sheets-Sheet 3

Inventor
Clarence H. Adams
by Wright, Brown, Quinby & May
Attys.

Inventor
Clarence H. Adams

Nov. 21, 1944. C. H. ADAMS 2,363,033
DOUBLE END TOOLING MECHANISM AND ATTACHMENT
Filed Nov. 28, 1940 6 Sheets-Sheet 5

Inventor
Clarence H. Adams

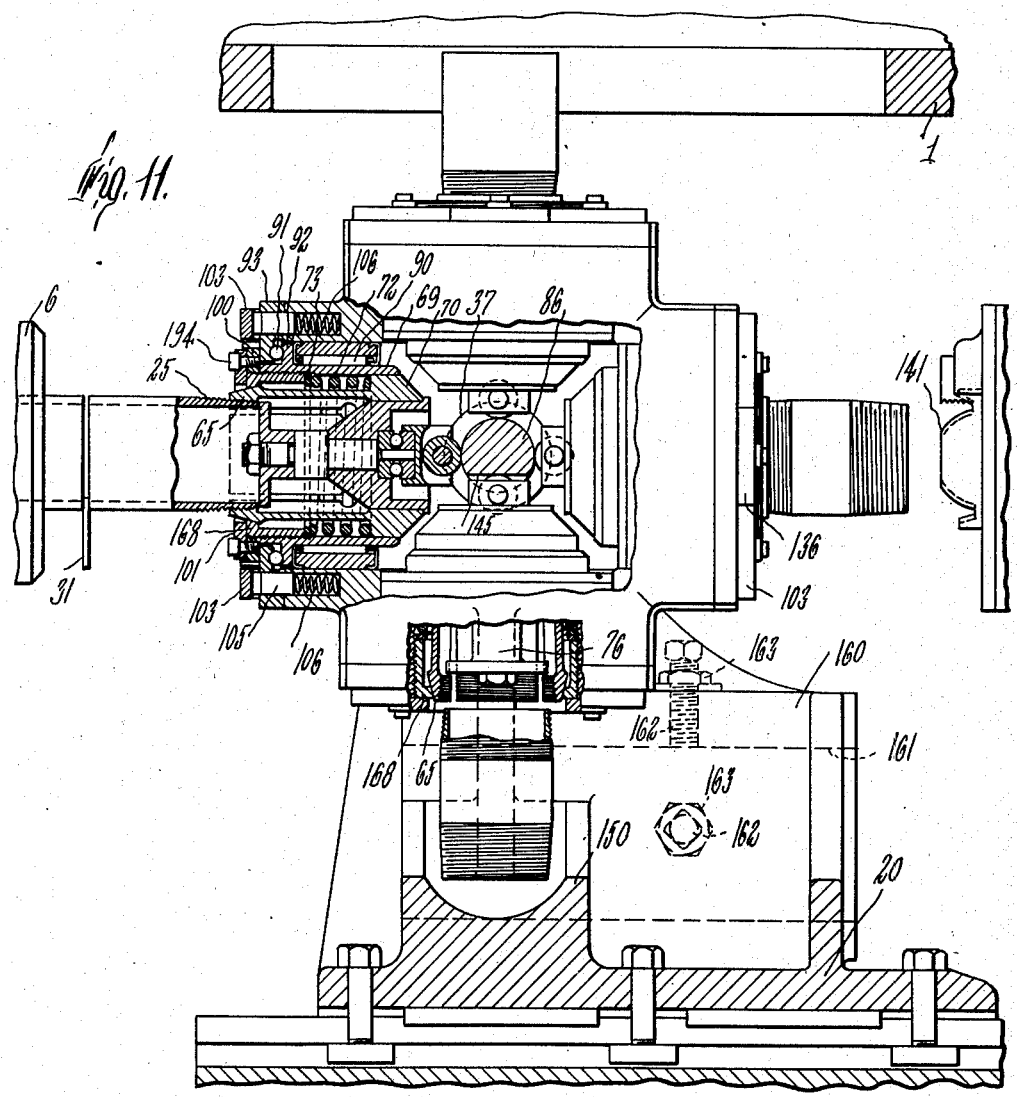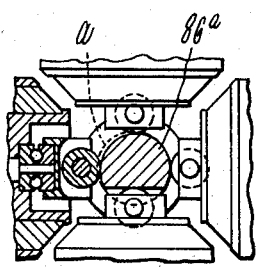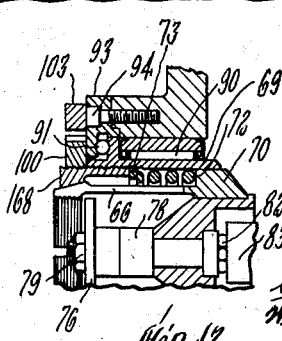

Patented Nov. 21, 1944

2,363,033

UNITED STATES PATENT OFFICE 2,363,033

DOUBLE END TOOLING MECHANISM AND ATTACHMENT

Clarence H. Adams, Windsor, Vt., assignor to Cone Automatic Machine Company, Inc., Windsor, Vt., a corporation of Vermont Application November 28, 1940, Serial No. 367,529

11 Claims. (Cl. 29—38)

In the manufacture of articles from bar or tubular stock, it is sometimes desired to perform end tooling operations on both ends of the work pieces cut off from the stock. An automatic lathe or screw machine as ordinarily arranged may be capable of performing the end tooling operations on the outer end of the work piece before it is cut off from the bar or tubular stock, but of itself it is not adapted to perform tooling operations on the work piece after the work piece has been cut off, the cutting off operation being a final operation of such machines.

An object of the present invention, therefore, is to provide means by which the work piece after being cut off is supported and presented to one or more working tools at the cut end. This avoids a second handling and machining of the work piece in a separate machine in order to complete the desired machining operations thereon. As applied to an automatic lathe, therefore, this invention provides an attachment including means for taking the work pieces as they are severed from the stock and performing the subsequent machine operations before releasing the work from the machine.

In accordance with this invention, therefore, means are provided for supporting engagement of the work piece before it is cut off from the stock and for presenting the cut end after complete severance to the desired tool or tools for completing the desired operations at or adjacent to the cut end and for thereafter releasing the work.

For a more complete understanding of this invention, reference may be had to the accompanying drawings in which Figure 1 is a somewhat diagrammatic front elevation of a multiple spindle lathe of the well known Cone type showing a mechanism of this invention as an attachment thereto.

As shown the lathe is a four spindle machine but the number of spindles is immaterial in so far as this invention is concerned.

Figure 1:
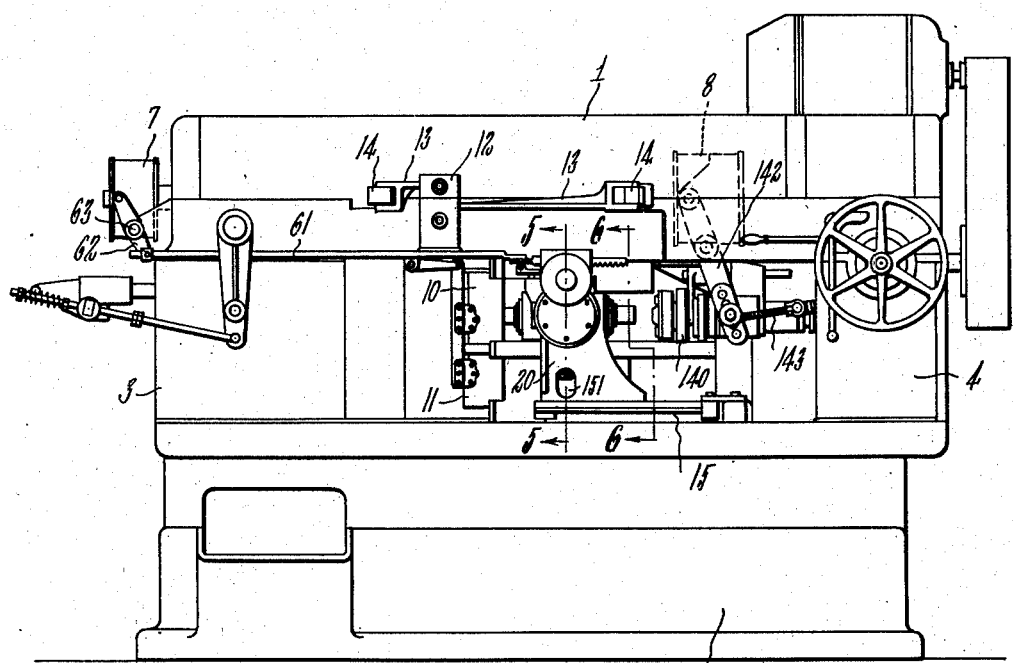
Figure 2:
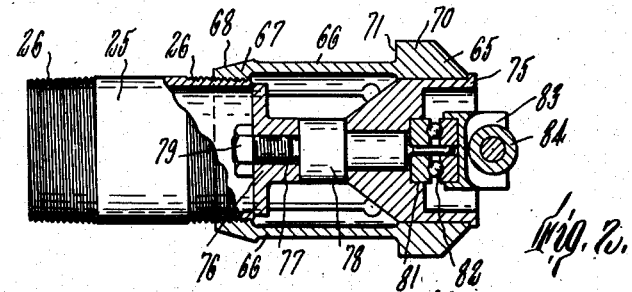
Figure 2 is a central longitudinal section of a work holding member for threaded tubular work.
Figure 3:
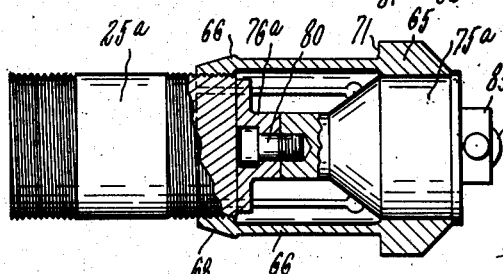
Figure 3 is a view partly in elevation and partly in longitudinal central section of a work holding member for threaded bar work.
Figure 5:
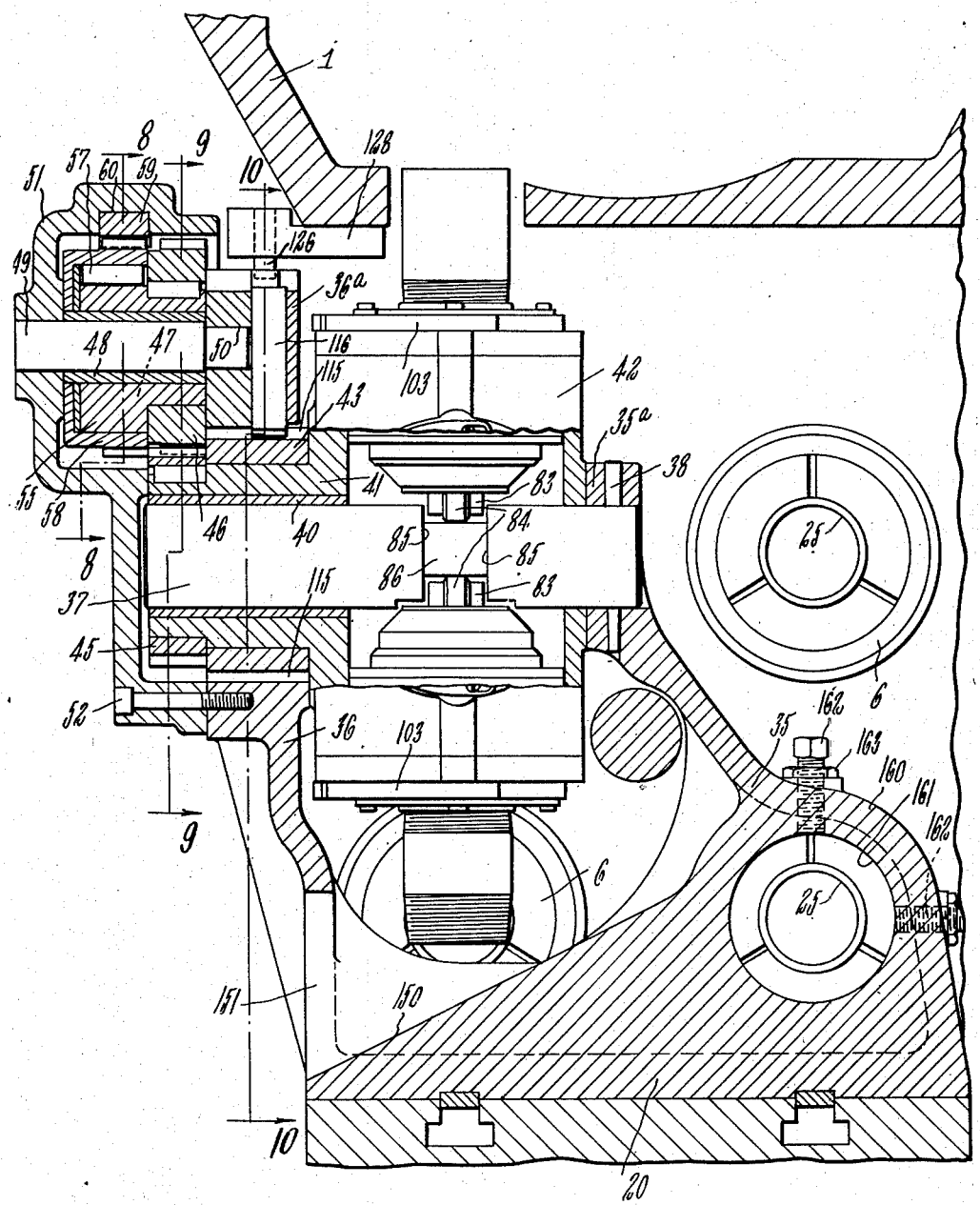
Figure 6:
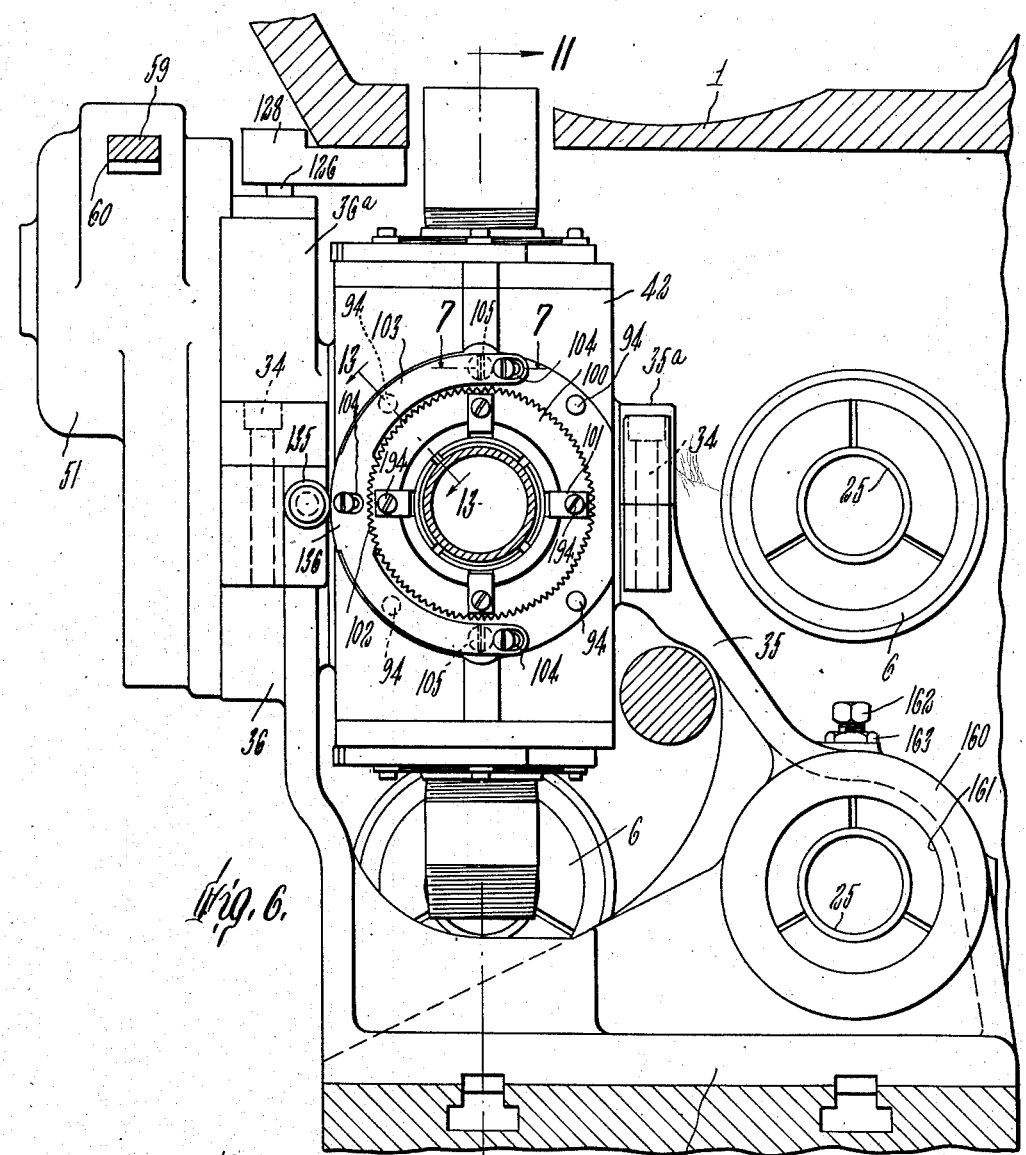

Figures 5 and 6 are detail sections on lines 5—5 and 6—6, respectively, of Figure 1 and showing the work holding member of either Figure 2 or Figure 3.

Figure 7:
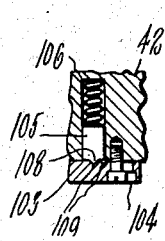

Figures 7 and 11 are detail sections on lines 7—7 and 11—11, respectively, of Figure 6.

Figure 8:
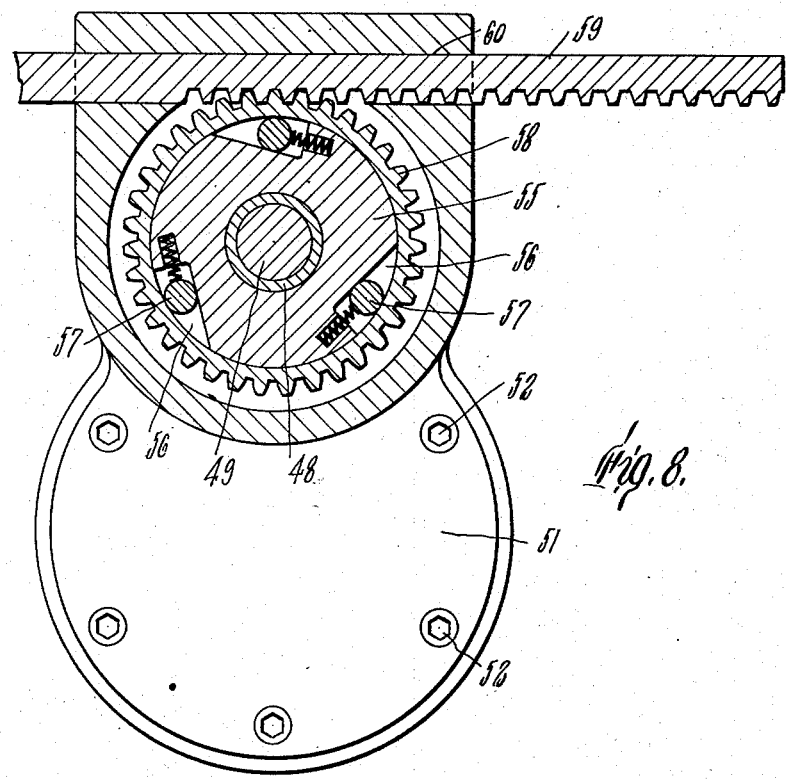
Figure 9:
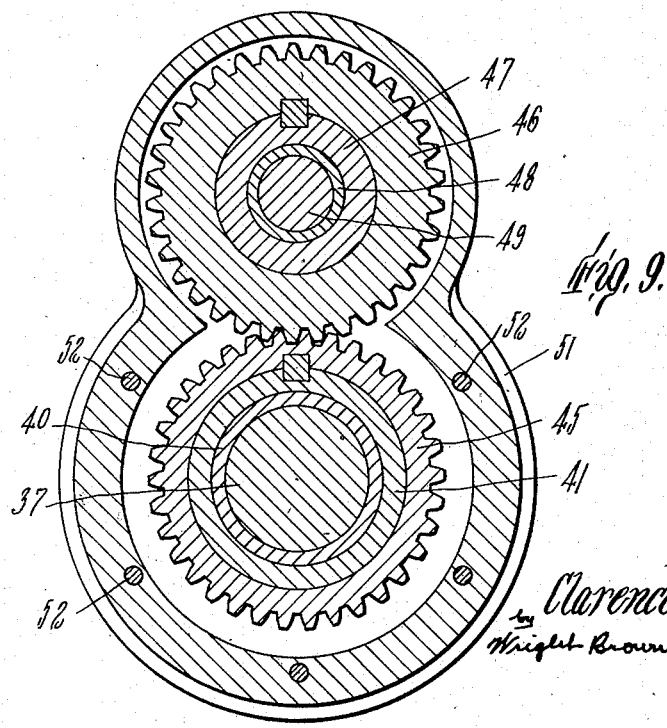
Figure 10:
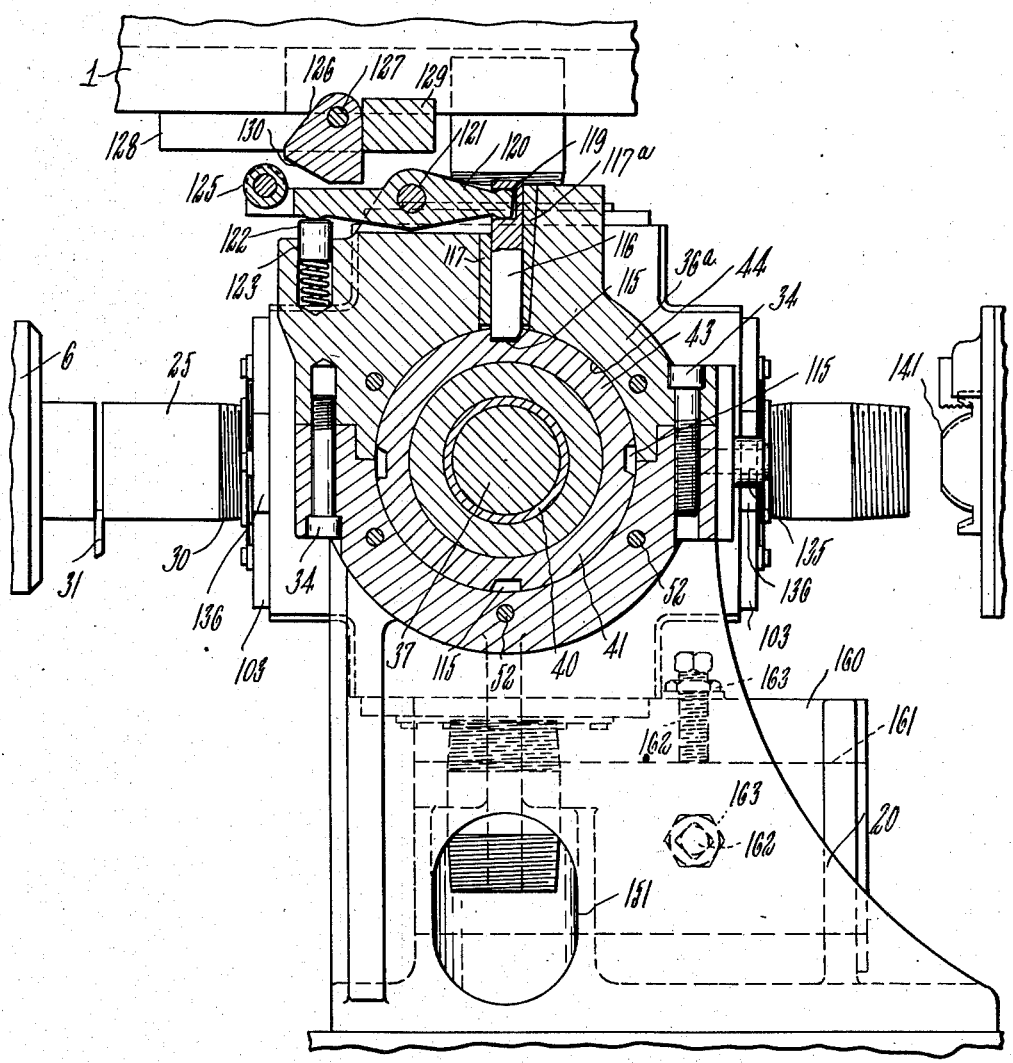

Figures 8 to 10, inclusive, are detail sections on the correspondingly numbered section lines of Figure 5.

Figure 4:
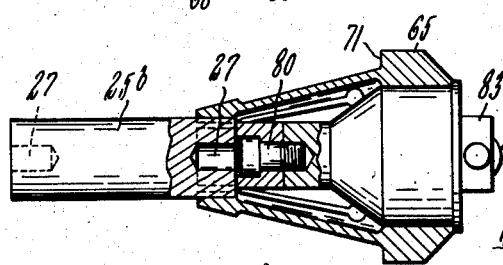
Figure 4 is a view similar to Figure 3, but of a work holding member suitable for unthreaded work.

Figure 12 is a view similar to a portion of Figure 11, but showing a modification which may be employed when the work holding member of Figure 4 is used.

Figure 13 is a detail section on line 13—13 of Figure 6.

In Figure 1 is shown a multiple spindle automatic lathe of the well known Cone type such as shown, for example, in the Cone Patent No. 1,271,540, dated July 9, 1918. In a machine of this type there are upper and lower beds 1 and 2 joined at their ends by the columns 3 and 4. Within the column 3 is positioned a turret (not shown herein) in which are carried, arranged in circular array about its indexing axis, a plurality of hollow work holding spindles 6 through which bar or tubular stock may be extended, held during machining and cutting off, and fed forwardly. The upper bed 1 has journaled longitudinally thereof a cam shaft carrying a plurality of cam drums, two of which are shown at 7 and 8 in Figure 1, these cam drums carrying cams which cause the actuation of various parts of the machine in suitable timed relation. The work spindles 6 are rotated and the desired tools are mounted for motion relative to the work extending from the spindles to perform the desired tooling operations thereon. As shown in Figure 1, for example, there are a pair of front tool slides 10 and 11 which are moved inwardly from the front of the machine toward the back by the rocking of the posts 12 actuated by levers 13 and connections 14 to suitable cams (not shown) on another pair of the overhead cam drums. At 15 is a slide which moves axially of the spindles as shown in the Cone patent to which reference has been made, and in addition to supporting tools in the manner there shown it is employed in connection with the present invention to carry a support 20 for an attachment which will be further described. There may also be tool carriages similar to the tool carriages 10 and 11 sliding in from the back of the machine as shown in the Cone patent, and other tools may be employed which may be moved axially of the spindles, being actuated by suitable cams on the main cam drum. Tools of this description are illustrated, for example, in the Cone Patent No. 1,934,620 of June 29, 1931, the machine shown in this patent being an eight rather than a four spindle machine. However, the number of spindles employed is immaterial to this invention.

As illustrated in Figure 2 herein, a piece of work which it may be desired to make is a hollow ferrule 25 formed up from tubular stock and having external tapered threads 26 at each end. In Figure 3, the work piece 25a is shown as formed of solid stock and provided with straight or non-tapered threads at opposite ends, while in Figure 4 the work piece 25b is a cylindrical block having holes 27 in opposite ends and unthreaded. While in each of Figures 2, 3, and 4 the work is shown as symmetrical at opposite ends, it will be understood that this is not essential as the work may have wholly unlike machining operations performed thereon at opposite ends if desired, it being only necessary to provide the proper tools for performing the desired operations.

The structure shown in Figures 5 to 11, inclusive, is illustrated as designed for work of the type shown in Figure 2, but it will be understood that this is for the purpose of illustration only and not by way of limitation. Where the work is to be externally threaded at the end of the stock projecting from the work spindle 6, a suitable threading tool will, of course, be provided and after the work has been so threaded, this portion which projects from the spindle will be cut off in the usual manner as by a cutting off tool 31. However, before the cutting off tool has operated, mechanism carried by the support 20 will have engaged the projecting end of the work so that it will be held when cut off from the main portion of the stock and as will later appear, this mechanism carried by the support 20 is then manipulated to present the cut end of the stock to another tool or tools to perform the desired operations on that end of the work piece, after which the work piece machined at or adjacent to both ends is discharged from the machine.

As shown best in Figure 5, the support 20 is provided with a pair of spaced upstanding wall portions 35, 35a and 36, 36a, between which extends a shaft 37 which may be held from rotation in the wall portions 35, 35a and 36, 36a, as by a taper pin 38 engaging mating holes in the wall portions 35 and 35a and the shaft 37. The upper wall portions 35a and 36a are secured to the lower wall portions 35 and 36 as by screws 34. The shaft 37 does not directly bear against the wall member 36, 36a, but there is interposed therebetween a bushing 40 on which is journaled a hub portion 41 of a turret 42. This hub 41 also has pressed thereon a ring member 43 which is journaled in a bore 44 of the wall member 36, 36a as shown best in Figure 10. The outer end of the hub 41 has keyed thereto a gear ring 45 (see Figures 5 and 9) with which meshes a gear 46 keyed to a hub member 47 journaled on a bushing 48 surrounding a stub shaft 49. The inner end of this stub shaft extends into a bore 50 in the wall member 36a and its outer end extends into a cover member 51 which houses the hub member 47 and the gears 46 and 45, and is secured to the outer face of the wall members 36, 36a as by screws such as 52. This casing 51 also houses an overrunning clutch mechanism (best shown in Figure 8) comprising an enlarged diameter portion 55 of the hub member 47 having the tapered slots 56 cut therein in which ride the spring pressed clutch rolls 57. These clutch rolls bear between the bases of the slots 56 and a ring gear 58 journaled on the hub portion 55, and as shown, the teeth of this ring gear 58 are in mesh with a rack bar 59 which extends through a slot 60 in the cap member 51. As shown in Figure 1, this rack bar 59 is connected to a rod 61 extending to the left hand end of the machine where it is pivoted to a lever 62 fulcrumed at 63 to the upper base member 1, the opposite end of the lever 62 carrying a cam roller controlled by cam elements (not shown) on the cam drum 7. By this mechanism the rack bar 59 is reciprocated at suitable times, rotating the gear 58 intermittently in one direction, the reverse direction of motion of the rack 59 being idle by reason of the overrunning clutch. This intermittent rotation of the gear 58 through the connections previously described acts to rotate the turret step by step thus to index it and as shown through 90° at each actuation.

The turret carries a plurality of work-engaging members in the form of spring collets 65 arranged in tubular casing portions radial to the axis of the shaft 37. For engaging work which is externally threaded, these collets, as shown in Figure 2 and Figure 3 are provided with spring jaws 66 having heads 67 internally threaded. These heads 67 have externally tapered faces 68 with which engage the reversely tapered faces on collet-closing sleeves 168. Each sleeve 168 is threaded into a second sleeve 69 which at its inner end slidably engages the rear enlarged diameter portion 70 of the collet and between a shoulder 71 on the outer face of this portion 70 and the inner end of the sleeve 168 there is positioned a coil spring 72. Interposed between the end of the collet sleeve 168 and this spring 72 may be positioned a wear ring 73. The spring 72 tends to force the collet inwardly toward the shaft 37 so as to allow the collet head to expand out of engagement with the work, but at suitable times the collet may be closed to engage the work.

There is slidably mounted within the collet 65 a block 75 to the forward end of which is secured a work stop 76, which may engage the end of the work and limit the extent to which the work may be inserted within the collet. In the form shown in Figure 2 this stop 76 is provided with a central bore for the reception of the threaded extremity 77 of a headed pin 78, a nut 79 engaging the end of this pin serving to retain the stop 76 in position thereon. Where the work is unprovided with a central bore, as shown in Figure 3, the stop 76a is formed to receive in its outer end in a countersunk hole therein the head of a screw 80 which may secure the stop 76a against the forward extremity of the block 75a. The pin 78 shown in Figure 2 extends axially into the block 75. In the bore 81 of the block 75 is positioned a thrust ballbearing 82 which supports a block 83 having spaced side walls between which is journaled a cam roller 84. A similar block 83 and thrust bearing is employed in the constructions of Figures 3 and 4. This block 83 rides in an annular groove in the shaft 37 between shoulders 85 with the roller 84 riding on the periphery of the reduced diameter portion 86 of the shaft 37 between the shoulders. This reduced diameter portion 86 is formed as a cam, and as will later more fully appear, at certain of the index stations of the turret forces the roller 84 outwardly against the action of the spring 72 and closes the collet against the work. The thrust bearing at 82 permits the collet to rotate with the work when this is not prevented by other means as will later appear. The sleeves 168 and 69 with the collet carried thereby form a rotatable spindle and at one of the index stations of the turret such spindle is in axial alinement with a work spindle 6 at one station of the machine. In the four-spindle machine shown, this station is the top forward station, though it should be understood that this turret may be arranged to cooperate with any desired operative station of the machine. Each of these spindles so constituted is mounted for rotation in the turret casing, being spaced therefrom as by the roller bearing 90 and a thrust ballbearing 91, this latter bearing being positioned between an annular shoulder 92 projecting from the sleeve 69 and a ring member 93 secured as by screws 94 to the outer end of an annular face portion of the turret casing.

As before noted, the support 20 is carried by the main tool slide of the machine which is given an axial motion toward and from the end of the lathe spindle turret, and after the work piece projecting from the machine spindle has had the desired machining operations performed at its outer end including, in the construction shown, the external threading, this support 20 is moved bodily toward the work, the collet 65 being in closed position, until the collet engages the external threads on the work, whereupon it is pulled fully onto the work until the work strikes the stop plate 76.

In order that the collet may be held against rotation until it is in full engagement with the rotating work, means are provided for yieldingly holding it against rotation until this engagement has been effected, whereupon this means is automatically disengaged so that the collet mechanism and its spindle parts are thereupon free to rotate so long as the portion of the work engaged remains connected to the length of stock supported in the rotating machine work spindle. This means comprises an externally toothed ring 100 which is threaded onto the outer end of the collet sleeve 168 and is held thereon by the screws 194 and the retaining elements 101. Cooperating with the external teeth of the ring 100 is an internally toothed portion 102 of a yoke member 103 which is secured to the member 93 by screw and slot connections at 104 (Figure 6). These screw and slot connections permit a limited motion of the yoke member crosswise of the axis of the collet so as to bring the toothed portion 102 into or out of engagement with the teeth of the ring 100, and it is yieldably retained in either of these positions in which it may be put, by a pair of spring pressed latch plugs 105 seated in recesses 106 in the turret casing 42.

The outer ends of each of these plugs 105, as shown best in Figure 7, is provided with a tooth 108 which may be in engagement with either selected of a pair of depressions 109 in the back face of the yoke member 103. The angularity of the side walls of the tooth 108 and the recesses 109 is sufficiently flat so that when lateral pressure is exerted on the yoke member 103, it may be moved from one to the other of its positions, the plug snapping out of one of the recesses 109 and into the other. When the yoke member is wedged outwardly the latch plugs and recesses act as a load and fire mechanism to effect complete disengagement of these parts.

When the collet is in position to receive the machined work piece extending from the lathe work spindle, the yoke 103 is initially in its locking position, preventing the rotation of the collet, but it is not positively so held, so that the collet remains stationary until the work is fully engaged therein and the stop plate 76 has been contacted. The mating serrations of the yoke and the ring 100 are sufficiently flat, however, so that the turning effort, when further entrance of the work into the collet is positively prevented, wedges the yoke 103 out from its locking position and snaps it into its inoperative position so that the collet is freed for rotation with the work. This continues until after the tool 31 has severed the machined work piece from the remainder of the stock 30, whereupon the turning effort exerted by the stock ceases and further rotation of the severed work piece is no longer effected. The cam mechanism which controls the position of the support 20 then acts to retract the severed work piece from the rotating stock sufficiently so that the cam 7 may then actuate the rack bar 59 and turn the collet turret through 90°.

This collet turret when in indexed position is locked therein and this lock must be released before the rack bar 59 is actuated. This locking and releasing means is shown best in Figure 10 and is as follows. The ring 43, to which reference was previously made, is provided in its periphery with locking notches 115 corresponding in number and spacing to the number and angular spacing of the index stations. As herein shown four of these notches are provided. Cooperating with these notches is a locking bolt 116 slidably mounted between guide plates 117 and 117a, one of which is tapered to provide for taking up wear by axial adjustment and both of which are seated in the upper side frame member 36a. This locking pin 116 is provided with a notch 119 in a side face within which extends the end of a lever 120 fulcrumed on the pin 121. The outer end of this lever is engaged by a spring pressed plug 122 slidable in a socket 123 in the member 36a so as normally to hold the latch pin 116 projected into locking engagement with any one of the notches 115 which happens to be in proper angular position at any one time. The outer end of the lever 120 is slotted to receive a cam roller 125 which may engage at suitable times a cam 126 pivoted at 127 to a member 128 adjustably secured to a portion of the frame of the upper bed 1. This cam 126 is normally retained in the position shown in Figure 10, bearing against an abutment portion 129 of the member 128, and it has an inclined lower face 130 under which the roller 125 rides when the support 20 is retracted. This face 130 bearing against the roller 125 rocks the lever 120 and retracts the locking pin so that the rack bar 59 may then be moved to index the turret. As soon as the support 20 is returned to its position to engage the work extending from a machine work spindle, the locking pin 116 is free to engage the succeeding locking notch 115 to lock the collet turret in its next indexed position. Due to its pivoted motion the cam 126 may yield freely to pressure toward the left as viewed in Figure 10.

The work which was engaged by the collet and taken from axial relation to the stock from which it was severed is then in a vertical position extending upwardly from the collet turret. At the next indexing operation this work piece is presented again in horizontal position in alinement with the stock from which it was cut but extending in the reverse direction. In this position of the work it is arranged to be held against rotation and for this purpose means are provided for forcing the locking yoke 103 into locking relation to the holding spindle and there retaining it. To this end (see Figures 6 and 10) the frame member 36 of the support has journaled on a pin projecting from its end face a cam roller 135 which engages with the outwardly projected peripheral portion 136 of the locking yoke and holds this yoke in locking position as long as the work piece is in this indexed position. It is then in condition to have machined its opposite end from that machined before it was cut off from the length of stock, and this machining operation may be done by the end working tool mechanism of any suitable description, indicated generally in Figure 1 at 140. Where it is desired to externally thread this end of the work, this may be accomplished by use of a rotary threading die 141. This may be carried by a rotary spindle which may be driven by the machine drive mechanism in a manner shown, for example, in the Cone Patent No. 1,934,620 and it may be moved toward and from the work by cams on the cam drum 8 through the action of a lever 142 and adjustable link 143, such type of mechanism being also shown in the Cone Patent No. 1,934,620 to which reference has heretofore been made. It should be evident, however, that the particular tooling mechanism will be chosen in view of the particular machining operations which it is desired to perform on the work presented in position therefor by the collet turret mechanism. This machining operation will, of course, be performed simultaneously with the machining operations and cutting off performed on the end of the stock projecting from the machine work spindle and which is taken by the diametrically opposed collet mechanism of the collet turret attachment prior to the succeeding indexing operation of this turret.

When these sets of operations have been completed, the support 20 is again moved away from the machine turret and the collet turret is indexed, this indexing motion bringing the work just cut off from the stock into the top turret position and the work operated upon by the end working tools into the bottom position shown in Figure 11. It will be noted that in this bottom position, as shown in Figure 11, the roller 84 engages a slabbed off under face 145 on the cam portion 86. This permits the spring 72 for this collet to retract the collet, thus allowing its spring jaws to spread outwardly and release the completely machined work which then drops into a trough 150 extending laterally of the support 20 and extending through an opening 151 in the forward face of the support 20 from which it is discharged from the machine.

Beside supporting and moving the work engaging and reversing turret mechanism, the support 20 may be provided with a boss 160 having a bore 161 therethrough in position to serve as a support for an end working tool (not shown) for operation on work at another station of the main work holding turret. As shown best in Figures 5 and 6 this may be the lower back station, the bore 161 being coaxial with the work spindle at this station, while the upper back station is shown as freely accessible for end working tools without reference to the support 20. Screws 162 with check nuts 163 may be employed to secure the end working tool support within the bore 161.

It will be noted that the work engaging and reversing turret is rotated about a substantially horizontal axis perpendicular to the axis of the spindle turret. This places the plane of rotation of the work-gripping means between the usual front and back work slides of the machine where it causes no interference with their normal motions toward and from the turret axis and it also positions the work piece after the final machining operations downwardly extending so that merely the release of the engaging means causes the finished work piece to be discharged by gravity.

When work which is not threaded is to be handled by this mechanism, as shown, for example, in Figure 4, it is of course not possible to close the collet jaws completely before they engage the work projecting from the lathe spindle, since without the threaded engagement there is nothing to carry the collet jaws onto the work and lock it thereon. Where such a collet mechanism is employed, it is first presented to the work piece not fully closed and in order that this may be effected, the cam portion 86a which controls the closing of the collet is relieved from fully closing contour in the horizontal station of the collet turret where the collet is presented to the extending end of the stock. This is shown in Figure 12 where the dotted line a indicates the true cylindrical contour which if present would hold the collet in fully closed position at its first station where it takes the projecting end of the stock and holds it while it is being cut off from the remainder of the stock. This relief is sufficient to permit the collet to be pushed onto the work piece and support its outer end while permitting it to be rotated as long as this portion remains unsevered from the remainder of the stock which is being rotated by the machine work spindle, it being held, however, sufficiently firmly so that when the support 20 is retracted it holds the severed stock piece therein. As the collet turret is then indexed, the collet is forced outward against the action of its spring 72 to tightly engage the work piece so that by the time it reaches the position wherein the opposite end from that first machined is being subjected to machining operations, it is sufficiently firmly held to prevent being rotated by the action of the tool or tools during such machining operation. When it reaches its lowest index position, the collet jaws are fully released so that the work is freed for discharge from the machine as in the construction shown in Figure 11.

While in Figures 2, 3 and 4, the collet mechanism for engaging the work piece is shown in horizontal position and extending toward the machine spindle and at the same time the free end of the work piece is shown as machined, it will of course be evident that in this position of the collet mechanism the machining on that end would not have been effected, it being shown as machined in these figures merely to show clearly certain machining operations which it may be desired to effect on the cut end portion in the particular examples shown.

From the foregoing description of certain embodiments of this invention, it should be evident to those skilled in the art that various changes and modifications might be made without departing from the spirit or scope of this invention as defined by the appended claims.

I claim:

1. The combination of a lathe having a rotary hollow work spindle through which lengths of stock may be fed and clamped with an end portion projecting therefrom, means for performing a machining operation on the projecting portion of the stock and for then severing it from the remainder of the stock, of a turret positioned in front of said spindle and pivoted for indexing motion about a substantially horizontal axis transverse to the axis of said work spindle and having a work engaging member, and means for moving and turning said turret to cause said engaging member to engage and hold the projecting end of said stock spaced from said spindle while said projecting end is being cut off and to then remove said severed portion and reverse it end for end, and means for performing a second machining operation on the severed end of said portion while it is engaged by said engaging member in reversed position.

2. The combination of a lathe having a rotary hollow work spindle through which a length of stock may be fed and clamped with an end portion projecting therefrom, means for performing a machining operation on the projecting portion of the stock and for then severing it from the remainder of the stock, of a turret positioned in front of said spindle and having a work engaging member, and means for moving and turning said turret to cause said engaging member to engage and hold the projecting end of said stock spaced from said spindle while said projecting end is being cut off and to then remove said severed end portion and reverse it end for end, means for performing a second machining operation on the severed end of said portion while it is engaged by said engaging member in reversed position, said indexing motion presenting said severed portion downwardly extending after the performance of said second machining operation, and means causing said engaging member to release said portion when said portion is so downwardly presented.

3. The combination with a hollow rotary work spindle for the reception of lengths of stock, means for threading the outer end of said stock, a movable stock support, a threaded stock engaging member rotatably carried by said support for engagement with the threaded end of said stock to rotate therewith, means yieldingly holding said member against rotation until the threads of the stock are run onto the threads of said member, means for cutting off the threaded portion of said stock after said element has become engaged therewith, and means for moving said stock supporting member toward and from said spindle.

4. In combination, a threaded stock engaging member for engagement with a threaded portion of stock, means for rotating said stock, means supporting said member for free rotation with said stock, and mechanism for initially holding said member against rotation until said threaded portion has fully engaged said member, said mechanism including a member-engaging element and connections between said member and element for moving said element out of engagement with said member when the turning force exerted on said member by the stock in engagement therewith reaches a determined value.

5. In combination, a threaded stock engaging member for engagement with a threaded portion of stock, means for rotating said stock, means supporting said member for free rotation with said stock, and mechanism for initially holding said member against rotation until said threaded portion has fully engaged said member, said mechanism including an element mounted for movement transverse to the axis of said member, said element and member having confronting cam serrations, and latch mechanism yieldingly holding said element in either of two positions in one of which its serrations engage the serrations of said member and hold said member against rotation and in the other of which said element is out of engagement with said member and said member is free be to rotated.

6. In combination, a threaded stock engaging member for engagement with a threaded portion of stock, means for rotating said stock, means supporting said member for free rotation with said stock, and mechanism for initially holding said member against rotation until said threaded portion has fully engaged said member, said mechanism including an element mounted for movement transverse to the axis of said member, said element and member having confronting cam serrations, latch mechanism yieldingly holding said element in either of two positions in one of which its serrations engage the serrations of said member and hold said member against rotation and in the other of which said element is out of engagement with said member and said member is free to be rotated, and means for holding said latch mechanism in latching position.

7. Mechanism comprising a support having spaced side walls, a shaft extending between said walls, a turret journaled on said shaft between said walls, said turret having a plurality of tubular casing portions having their axes radially arranged with respect to said shaft, a spindle journaled coaxially in each casing, a spring collet movable axially within each spindle, a spring normally urging said collet to open axial position, means for indexing said turret about said shaft, and a cam on said shaft in operative relation to said collets to close and retain said collets closed during predetermined angular positions thereof.

8. The combination with a rotary work holding spindle, means for machining work extending from said spindle, a support movable toward and from said spindle, an indexing turret carried by said support and provided with a plurality of work engaging devices movable by indexing of said turret into and out of operative relation to work on said spindle, each of said work-engaging devices comprising an opening and closing chuck for engaging or releasing the work, means supporting said chucks for rotation, means for yieldingly holding said chucks against rotation, a tool positioned at the opposite side of said turret from said spindle for operation on work held in a chuck extending theretoward, means for preventing yielding of said chuck-holding means while work therein is being operated upon by said tool, means for opening said chuck at another index station after the work has been operated upon by said tool, means for moving said support from and toward said spindle, and means for indexing said turret.

9. In combination, a rotary stock engaging member having a serrated peripheral portion, a support in which said member is journaled, an element carried by said support movable transversely of said member and having serrations for engagement with said serrated peripheral portion, and latch means for yieldingly holding said element in either of two positions in one of which its serrations engage the serrations of said member and hold said member against rotation and in the other of which its serrations are out of engagement with the serrations of said member and said member is free to be rotated.

10. The combination in a multiple spindle lathe, a turret, rotary work carrying spindles carried by said turret in circular array about an indexing axis, a support movable in line with said axis toward and from said turret, means carried by said support for taking work from a work spindle at one index station and reversing said work end for end, tools for operating on the work in its reversed conditions, means on said support for carrying tools for operation on work carried by said turret at another index station, and means for moving said support.

11. The combination of a lathe having an indexing turret, work spindles through which lengths of stock may be fed and chucked with end portions projecting therefrom, said spindles being rotatable in said turret about axes arranged in circular array about the indexing axis of said turret, tool carriers mounted for motion toward and from the axis of said turret and carrying tools for performing machining operations on the projecting portions of said stock and thereafter at one index station severing a portion of the stock partly machined from the remainder thereof, of means for holding said portion of the stock while it is being severed, means for moving said holding means with said portion after said severing and turning said portion around an axis transverse to said spindle axis and between said tool carriers away from said index station, and a tool positioned to perform a machining operation on said portion while it is held by said holding means.

CLARENCE H. ADAMS.